(12) United States Patent
Ginder et al.

(10) Patent No.: US 12,698,158 B2
(45) Date of Patent: Aug. 4, 2026

(54) ADJUSTABLE TRANSITION FOR CONNECTING DISCHARGE END OF CONVEYOR TO GRAIN STORAGE BIN OR GRAIN DRYER

(71) Applicant: CTB, Inc., Milford, IN (US)

(72) Inventors: Tyler Ginder, Olney, IL (US); Steve Bullock, Vincennes, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 18/802,656

(22) Filed: Aug. 13, 2024

(65) Prior Publication Data

US 2025/0074705 A1    Mar. 6, 2025

Related U.S. Application Data

(60) Provisional application No. 63/534,973, filed on Aug. 28, 2023.

(51) Int. Cl.
B65G 11/12         (2006.01)
B65G 47/20         (2006.01)
(52) U.S. Cl.
CPC .... B65G 11/126 (2013.01); B65G 2201/0202 (2013.01)
(58) Field of Classification Search
None
See application file for complete search history.

(56)                References Cited

U.S. PATENT DOCUMENTS

| | | | | |
|---|---|---|---|---|
| 1,798,231 | A | * | 3/1931 | Thiemann .......... B65G 69/0441 |
| | | | | 198/536 |
| 3,510,171 | A | * | 5/1970 | Bacon ..................... E01H 5/045 |
| | | | | 406/161 |
| 5,099,986 | A | * | 3/1992 | Kuzub ................... B65G 33/16 |
| | | | | 198/666 |
| 5,127,507 | A | * | 7/1992 | McDermott ......... B65G 11/186 |
| | | | | 193/17 |
| 5,167,581 | A | * | 12/1992 | Haag .................. A01D 41/1217 |
| | | | | 56/16.6 |
| 5,343,995 | A | * | 9/1994 | Scarrow ............. B65G 69/0441 |
| | | | | 198/535 |
| 5,498,119 | A | * | 3/1996 | Faivre ....................... B60P 1/36 |
| | | | | 198/313 |

(Continued)

FOREIGN PATENT DOCUMENTS

KR          20120136839 A     12/2012

OTHER PUBLICATIONS

DBAR Adjustable Cushion Box, LCDM Corp, Aug. 21, 2023.
(Continued)

*Primary Examiner* — Kavel Singh
(74) *Attorney, Agent, or Firm* — Harness, Dickey & Pierce, P.L.C.

(57)                ABSTRACT
A transition for connecting a discharge end of a conveyor to an inlet end of a grain storage bin or grain dryer is disclosed. The transition includes an upper half configured to be attached to the discharge end of the conveyor, a lower half configured to be attached to the inlet end of the grain storage bin or grain dryer, and a pivot joint connecting the upper and lower halves to one another while allowing the upper and lower halves to pivot relative to one another to accommodate an angle at which the conveyor is inclined.

20 Claims, 7 Drawing Sheets

(56)     References Cited

U.S. PATENT DOCUMENTS

| | | | |
|---|---|---|---|
| 6,497,546 B2 * | 12/2002 | Wood ........................ | B60P 1/42 |
| | | | 414/335 |
| 6,591,974 B2 * | 7/2003 | Tofin ...................... | B65G 33/24 |
| | | | 198/671 |
| 6,691,852 B1 | 2/2004 | Nolin | |
| 7,644,816 B2 * | 1/2010 | Veiga Leal ........ | A01D 41/1217 |
| | | | 56/16.6 |
| 8,863,932 B1 | 10/2014 | Nolin | |
| 9,604,785 B1 | 3/2017 | Gaerke | |
| 2001/0026755 A1 | 10/2001 | Wood et al. | |
| 2005/0263373 A1 | 12/2005 | Boevers | |

OTHER PUBLICATIONS

Cushion Box, 2022 Catalog, Nolin Milling, Inc., 2022.
Cushion Boxes, Catalog p. 12, Premier Components, Inc., Aug. 21, 2023.
Invitation to Pay Additional Fees and Partial Search Report mailed on Nov. 12, 2024, in corresponding International Application No. PCT/US2024/042254.
Examination Search Report regarding CA H8327979, dated May 14, 2026.

* cited by examiner

ADJUSTABLE TRANSITION FOR CONNECTING DISCHARGE END OF CONVEYOR TO GRAIN STORAGE BIN OR GRAIN DRYER

CROSS-REFERENCE TO RELATED APPLICATIONS

This application claims the benefit of U.S. Provisional Application No. 63/534,973, filed on Aug. 28, 2023. The entire disclosure of the application referenced above is incorporated herein by reference.

FIELD

The present disclosure relates to grain handling products and, more particularly, to adjustable transitions for connecting a discharge end of a conveyor to a grain storage bin or a grain dryer.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A transition connects the discharge end of a conveyor to an inlet end of a grain storage bin or dryer. The conveyor is typically inclined at an angle (e.g., 30 or 45 degrees) with respect to a horizontal plane and carries grain upward to the inlet end of the grain storage bin or dryer, which lies within the horizontal plane. Thus, the transition is made to accommodate the angle at which the conveyor is inclined.

In some cases, the incline angle of the conveyor may differ from the conveyor incline angle for which the transition is made due to, for example, the conveyor resting on unlevel ground. In turn, the transition may need to be modified, or an additional transition may need to be made, to accommodate the incline angle of the conveyor, which requires additional fabrication and labor in the field. This can result in additional cost for millwright crews installing the conveyor.

SUMMARY

An example of a transition according to the present disclosure is for connecting a discharge end of a conveyor to an inlet end of a grain storage bin or grain dryer. The transition includes an upper half configured to be attached to the discharge end of the conveyor, a lower half configured to be attached to the inlet end of the grain storage bin or grain dryer, and a pivot joint connecting the upper and lower halves to one another while allowing the upper and lower halves to pivot relative to one another to accommodate an angle at which the conveyor is inclined.

In one aspect, the upper half includes an inner housing and an outer housing, and the lower half is inserted between the inner and outer housings of the upper half as the lower half is pivoted toward the upper half.

In one aspect, each of the inner housing, the outer housing, and the lower half includes side walls and a front wall.

In one aspect, as the lower half is pivoted toward the upper half, the front wall of the lower half is inserted between the front walls of the inner and outer housings of the upper half, and the side walls of the lower half are inserted between the side walls of the inner and outer housings of the upper half.

In one aspect, the transition has a first open end configured to receive grain from the conveyor and a second open end configured to discharge grain to the grain storage bin or grain dryer, and the first and second open ends of the transition are disposed opposite from one another along a direction in which the upper and lower halves are pivotable relative to one another.

In one aspect, the pivot joint allows the upper and lower halves to pivot relative to one another to adjust an angle between the first and second open ends of the transition, and the angle is adjustable from a minimum value to a maximum value when the transition connects the conveyor to the grain storage bin or grain dryer.

In one aspect, a range between the minimum and maximum values is greater than 30 degrees.

In one aspect, the pivot joint includes at least one stud extending through a pair of holes in the upper half and through a pair of holes in the lower half.

In one aspect, the at least one stud includes a pair of bolts, one of the bolts is inserted through one of the holes in the upper half and one of the holes in the lower half, the other one of the bolts is inserted through the other one of the holes in the upper half and the other one of the holes in the lower half, and the pivot joint further includes a pair of nuts that are threaded onto shanks of the bolts.

In one aspect, the transition is free of any baffle or wear plate for cushioning grain that flows downward therethrough due to the force of gravity.

An example of a grain handling assembly according to the present disclosure includes a conveyor and a transition. The conveyor is configured to be inclined at an angle relative to a horizontal plane and to carry grain upward along its inclination angle. The conveyor has a discharge end. The transition is configured to connect the discharge end of the conveyor to an inlet end of a grain storage bin or gran dryer. The transition is adjustable to accommodate variations in the inclination angle of the conveyor.

In one aspect, the transition includes an upper half configured to be attached to the discharge end of the conveyor, a lower half configured to be attached to the inlet end of the grain storage bin or grain dryer, and a pivot joint connecting the upper and lower halves to one another while allowing the upper and lower halves to pivot relative to one another to accommodate the angle at which the conveyor is inclined.

In one aspect, the upper half includes an inner housing and an outer housing, and the lower half is inserted between the inner and outer housings of the upper half as the lower half is pivoted toward the upper half.

In one aspect, each of the inner housing, the outer housing, and the lower half includes side walls and a front wall.

In one aspect, as the lower half is pivoted toward the upper half, the front wall of the lower half is inserted between the front walls of the inner and outer housings of the upper half, and the side walls of the lower half are inserted between the side walls of the inner and outer housings of the upper half.

In one aspect, the transition has a first open end configured to receive grain from the conveyor and a second open end configured to discharge grain to the grain storage bin or grain dryer, and the first and second open ends of the transition are disposed opposite from one another along a direction in which the upper and lower halves are pivotable relative to one another.

In one aspect, the grain handling assembly further includes the grain storage bin or gran dryer, the pivot joint allows the upper and lower halves to pivot relative to one another to adjust an angle between the first and second open ends of the transition, and the angle is adjustable from a minimum value to a maximum value when the transition connects the conveyor to the grain storage bin or grain dryer.

In one aspect, a range between the minimum and maximum values is greater than 30 degrees.

In one aspect, the pivot joint includes at least one stud extending through a pair of holes in the upper half and through a pair of holes in the lower half.

In one aspect, the at least one stud includes a pair of bolts, one of the bolts is inserted through one of the holes in the upper half and one of the holes in the lower half, the other one of the bolts is inserted through the other one of the holes in the upper half and the other one of the holes in the lower half, and the pivot joint further includes a pair of nuts that are threaded onto shanks of the bolts.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An adjustable transition according the present disclosure includes an upper half and a lower half that is pivotable relative to the upper half, which enables the transition to accommodate various inclination angles of a conveyor without requiring additional fabrication or labor. The upper and lower halves of the transition are connected to one another through a pivot joint that allows the upper and lower halves to pivot relative to one another. The upper half includes an inner housing and an outer housing, and the lower half is inserted between the inner and outer housings as the lower half is pivoted toward the upper half. The inner housing of the upper half prevents grain flowing through the transition from spilling through gaps between the upper and lower halves.

Figure 1:
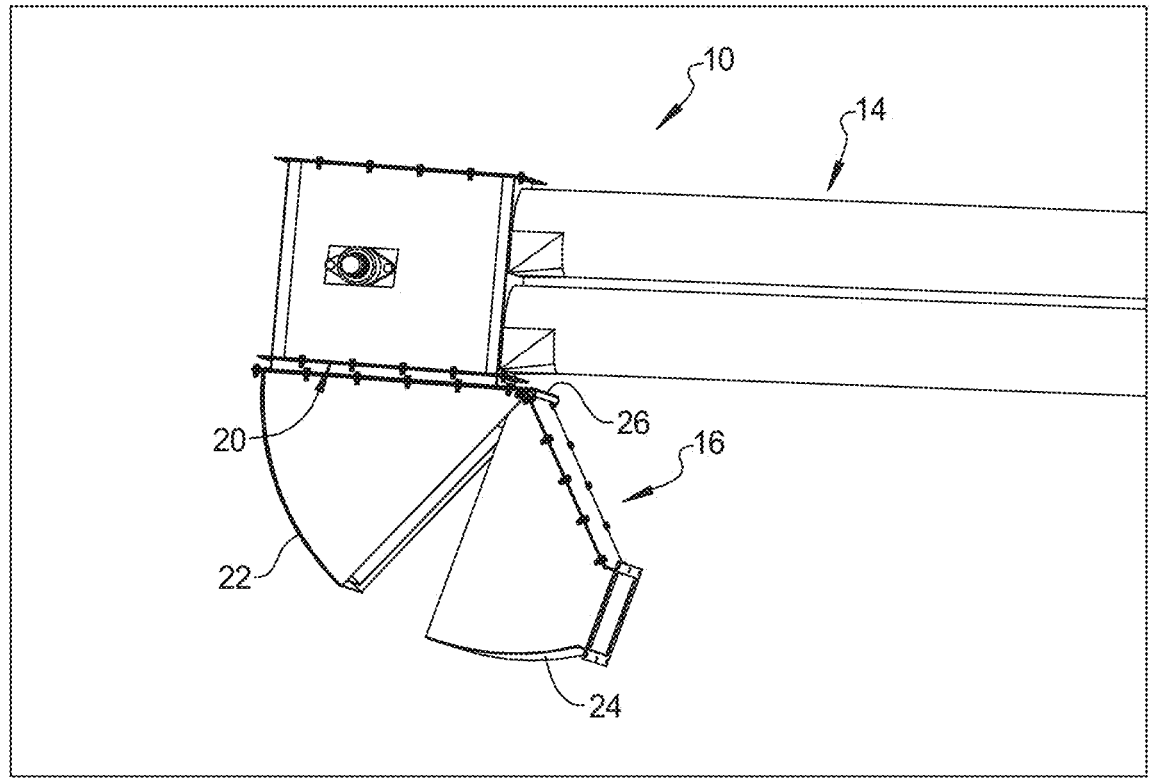
FIG. 1 is a perspective view of an adjustable transition according to the principles of the present disclosure attached to a discharge end of a conveyor.
Figure 2:
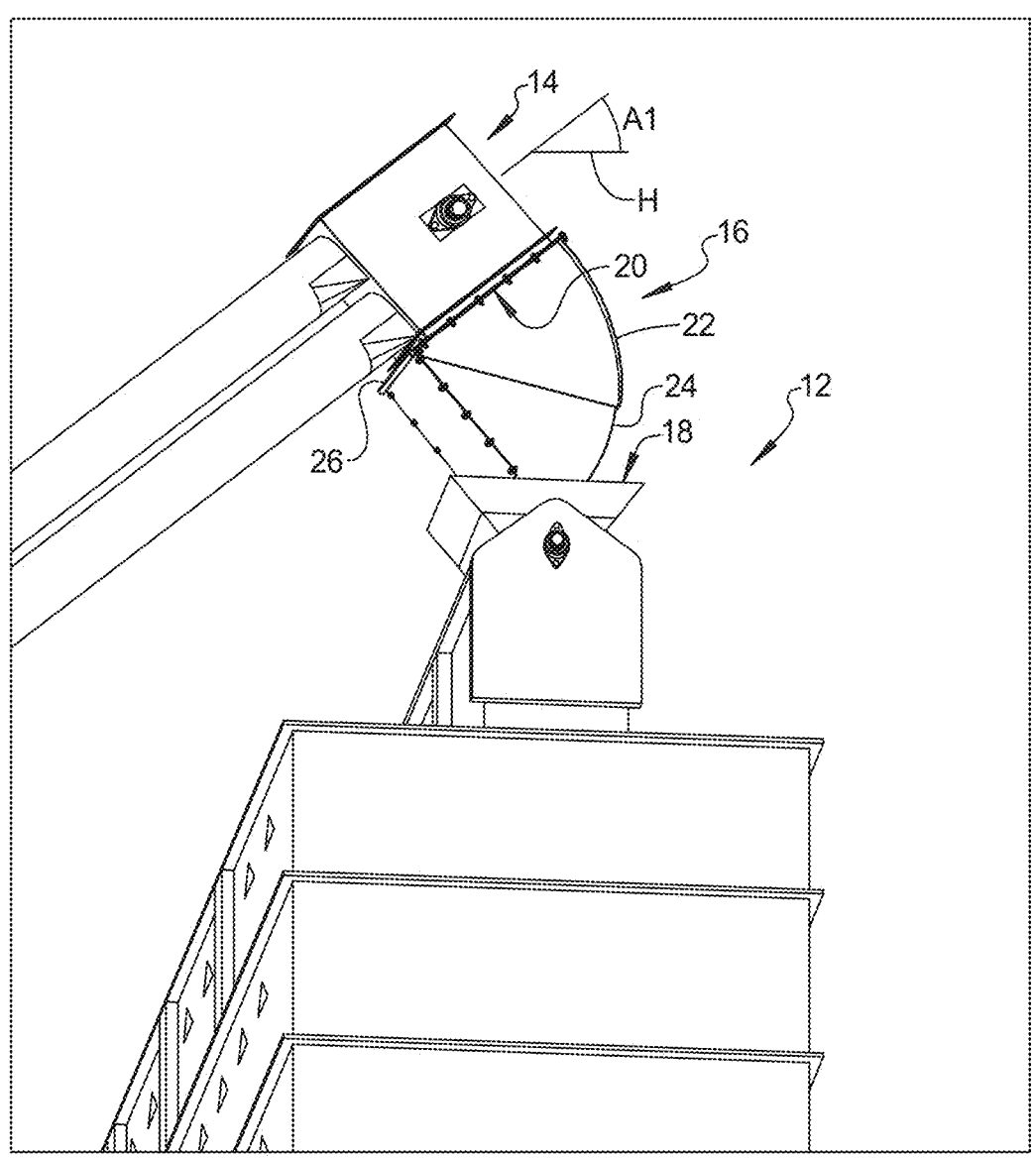
FIG. 2 is a perspective view of the adjustable transition of FIG. 1 connecting the discharge end of the conveyor to an inlet end of a grain dryer.

Referring now to FIGS. 1 and 2, a grain handling assembly 10 is operable to supply grain to a grain dryer 12 or a grain storage bin (not shown). The grain handling assembly 10 includes a conveyor 14 and a transition 16. The conveyor 14 is inclined at an angle A1 relative to a horizontal plane H and is operable to carry grain upward along the inclination angle A1 to an inlet end 18 of the grain dryer 12. The conveyor 14 may include an inlet hopper, a head or tail drive, a chain, and paddles (not shown). The inlet hopper receives grain. The drive may include an electric motor for moving the chain in a loop that extends along the length of the conveyor 14. The paddles are connected to the chain and push grain up the conveyor 14 as the driver moves the chain along the loop.

The transition 16 connects a discharge end 20 of the conveyor 14 to the inlet end 18 of the grain dryer 12, as shown in FIG. 2, or the grain storage bin. In addition, the transition 16 is adjustable to accommodate the inclination angle A1 of the conveyor 14. More particularly, the transition 16 includes an upper half 22, a lower half 24, and a pivot joint 26 that connects the upper and lower halves 22 and 24 to one another while allowing the upper and lower halves 22 and 24 to pivot relative to one another to accommodate the inclination angle A1 of the conveyor 14. In contrast to a cushion box that connects a down spout of a grain elevator to a grain bin at a lower elevation than the grain elevator, the transition 16 is free of any baffle or wear plate for cushioning grain that flows downward therethrough due to the force of gravity.

FIG. 1 shows the grain handling assembly 10 before it is installed onto the grain dryer 12 or the grain storage bin. In this state, the lower half 24 is free to swing away from the upper half 22. This movement allows properly setting the conveyor 14 and transition 16 in place without requiring additional fabrication or labor when installing the grain handling assembly 10 onto the grain dryer 12 or the grain storage bin. FIG. 2 shows the grain handling assembly 10 after it is installed onto the grain dryer 12.

Referring now to FIGS. 3 through 8, the upper half 22 of the transition 16 includes an inner housing 28 and an outer housing 30. The inner housing 28 includes a planar back wall 32, planar side walls 34, a curved front wall 36, and a top flange 38. The back wall 32, the side walls 34, the front wall 36 define horizontal slots 40 disposed about the perimeter of the inner housing 28 near the top flange 38. The top flange 38 is a rectangular frame that defines holes 42 disposed about the perimeter of the inner housing 28. Fasteners are inserted through the holes 42 to attach the transition 16 to the discharge end 20 of the conveyor 14. The back wall 32, the side walls 34, the front wall 36, and the top flange 38 may be made of sheet metal. The back wall 32, the side walls 34, the front wall 36, and/or the top flange 38 may be formed (e.g., stamped) together as a single piece or formed separately and joined (fastened, welded) together. In one example, the upper ends of the back wall 32, the side walls 34, the front wall 36, are bent outward to form the top flange 38.

The outer housing 30 includes planar side walls 44, a curved front wall 46, and a top flange 48. The front wall 46 defines vertical slots 50 disposed adjacent to side edges thereof, and the front edges of the side walls 44 include tabs (not shown) that are inserted into the vertical slots 50. The top flange 48 includes tabs 52 disposed about the inner perimeter of the outer housing 30. The side walls 44, the front wall 46, and the top flange 48 may be made of sheet metal. The side walls 44, the front wall 46, and/or the top flange 48 may be formed together as a single piece or formed separately and joined together. In the example shown, the side walls 44, the front wall 46, and the top flange 48 are formed separate from one another, and the upper ends of the side and front walls 44 and 46 are bent outward and joined to the top flange 48 using fasteners 54.

Figure 3:
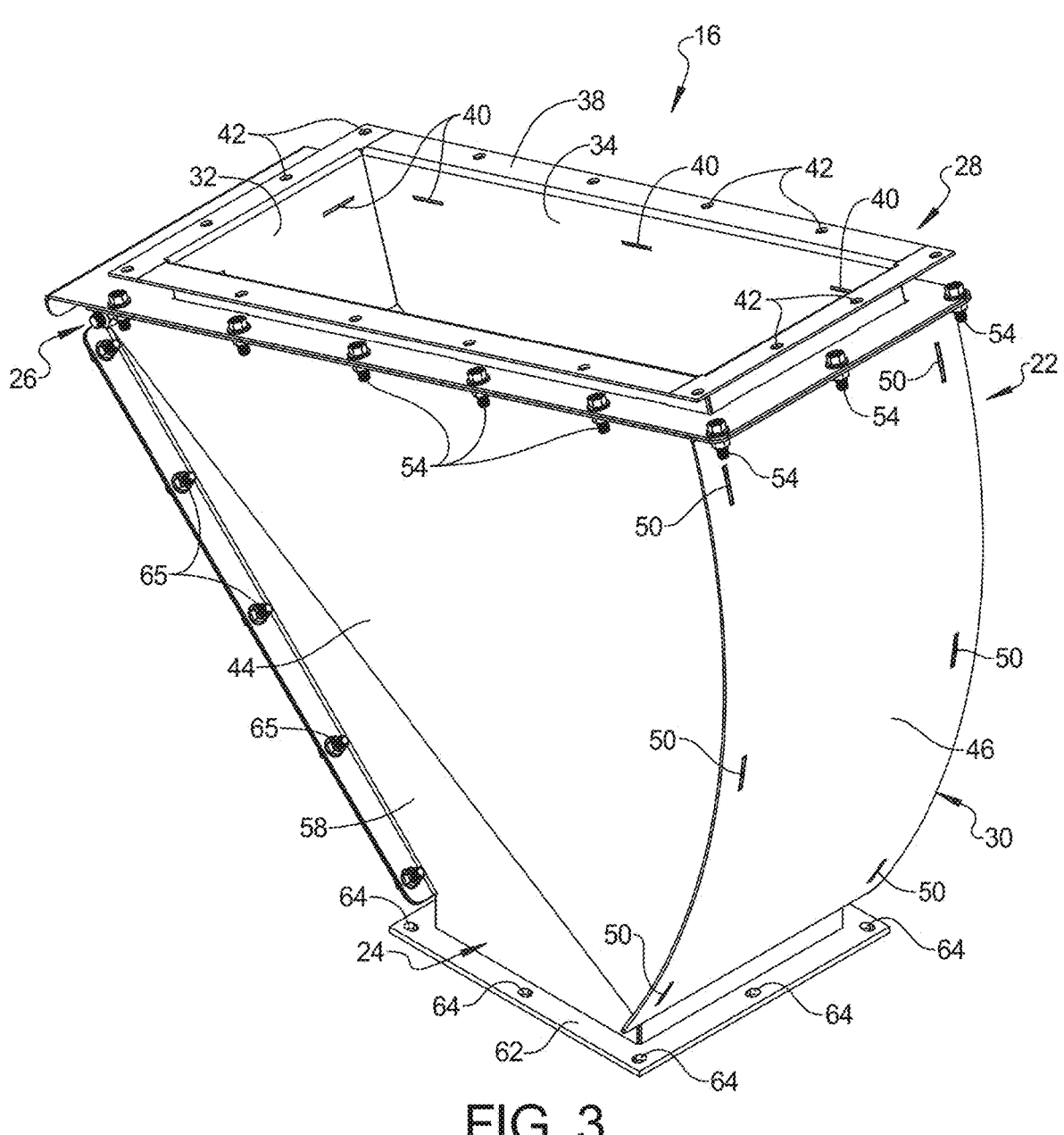
FIG. 3 is a top perspective view of the adjustable transition of FIG. 1.
Figure 4:
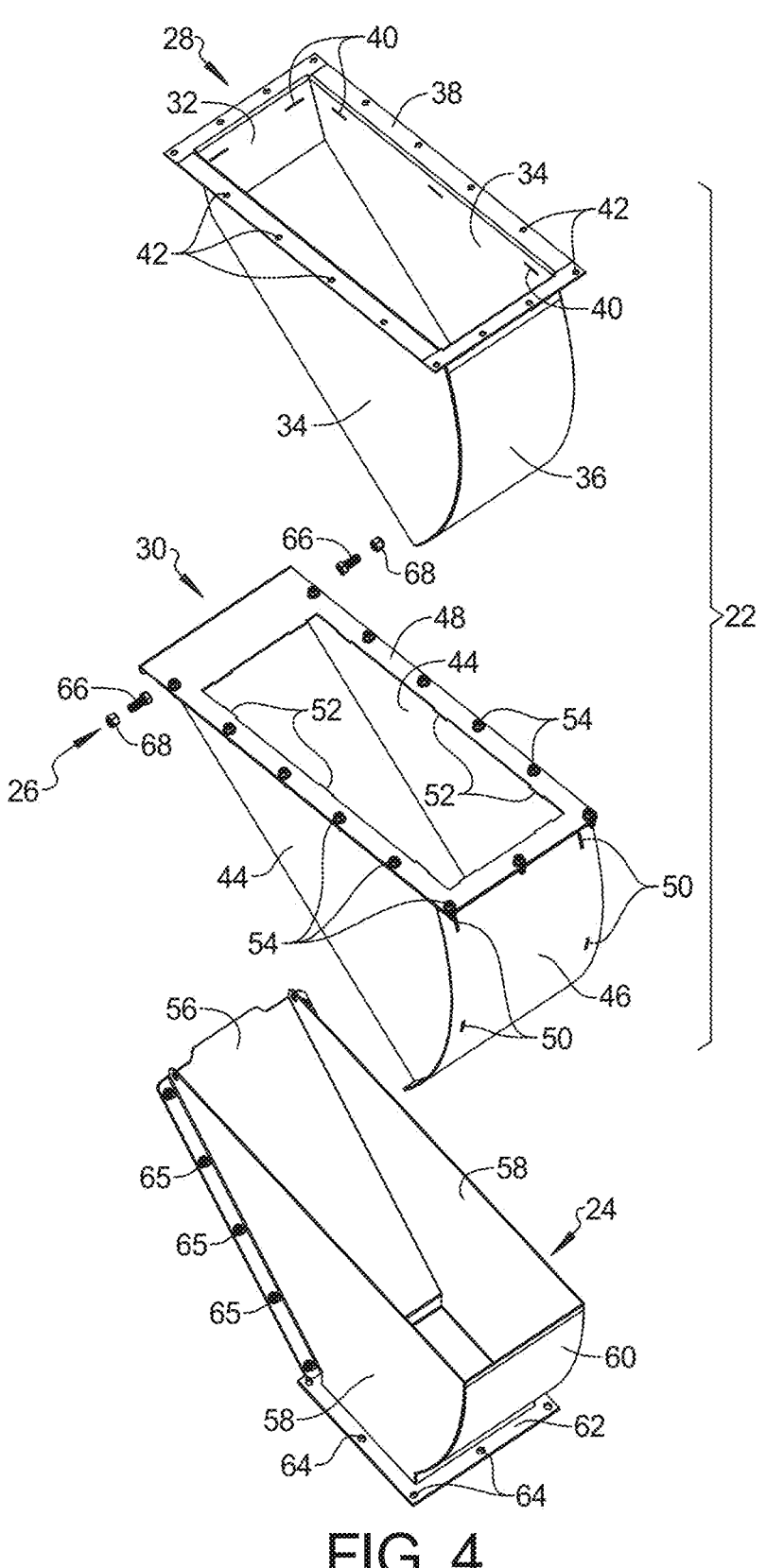
FIGS. 4 and 5 are exploded perspective views of the adjustable transition of FIG. 1.
Figure 5:
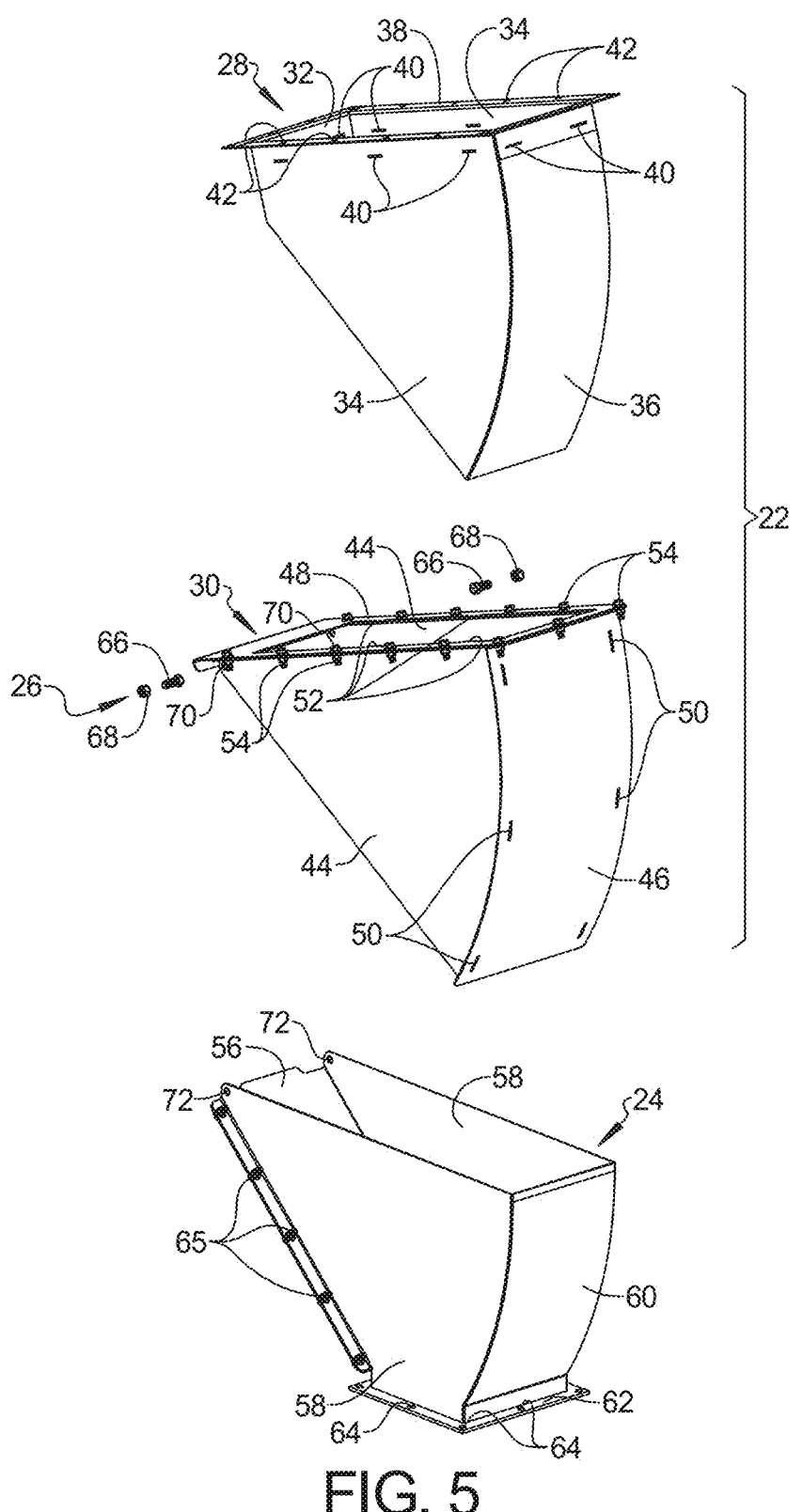

In one example, to manufacture the upper half 22 of the transition 16, the inner housing 28 is inserted into the outer housing 30 as shown in FIG. 3, and the tabs 52 on the inner housing 28 are inserted into the horizontal slots 40 in the outer housing 30. The inner and outer housing 28 and 30 are then welded together. Thus, the tabs 52 on the inner housing 28 and the horizontal slots 40 in the outer housing 30 serve as a manufacturing aid by positioning the inner and outer housing 28 and 30 relative to one another as the inner and outer housing 28 and 30 are welded together.

The lower half 24 of the transition 16 includes a planar back wall 56, planar side walls 58, a curved front wall 60, and a bottom flange 62. The bottom flange 62 defines holes 64 disposed about the perimeter of the lower half 24. Fasteners are inserted through the holes 64 to attach the transition 16 to the inlet end 18 of the grain dryer 12 or the grain storage bin. The back wall 56, the side walls 58, the front wall 60, and the bottom flange 62 may be made of sheet metal. The back wall 56, the side walls 58, the front wall 60, and/or the bottom flange 62 may be formed together as a single piece or formed separately and joined together. In the example shown, the back wall 56 and the side walls 58 are formed separate from one another, and the rear edges of the side walls 58 are bent outward and joined to the back wall 56 using fasteners 65.

The pivot joint 26 of the transition 16 includes a pair of bolts 66 and a pair of nuts 68. Each bolt 66 is inserted through one of a pair of holes 70 in the upper half 22 and through one of a pair of holes 72 in the lower half 24, and then one of the nuts 68 is threaded onto the shank of the bolt 66 to retain the bolt 66 in the holes 70, 72. In the example shown, the holes 70 extend through the side walls 44 of the outer housing 30 of the upper half 22, and the holes 72 extend through the side walls 58 of the lower half 24. In various implementations, the bolts 66 may be replaced with a single longer bolt that is inserted through both of the holes 70 in the upper half 22 and both of the holes 72 in the lower half 24, in which case the nuts 68 may be replaced with a single nut. Alternatively, the bolts 66 may be replaced with one or more threadless studs, in which case the nuts 68 may be replaced with one or more unthreaded fasteners such as a cotter pin.

Figures 6, 7:
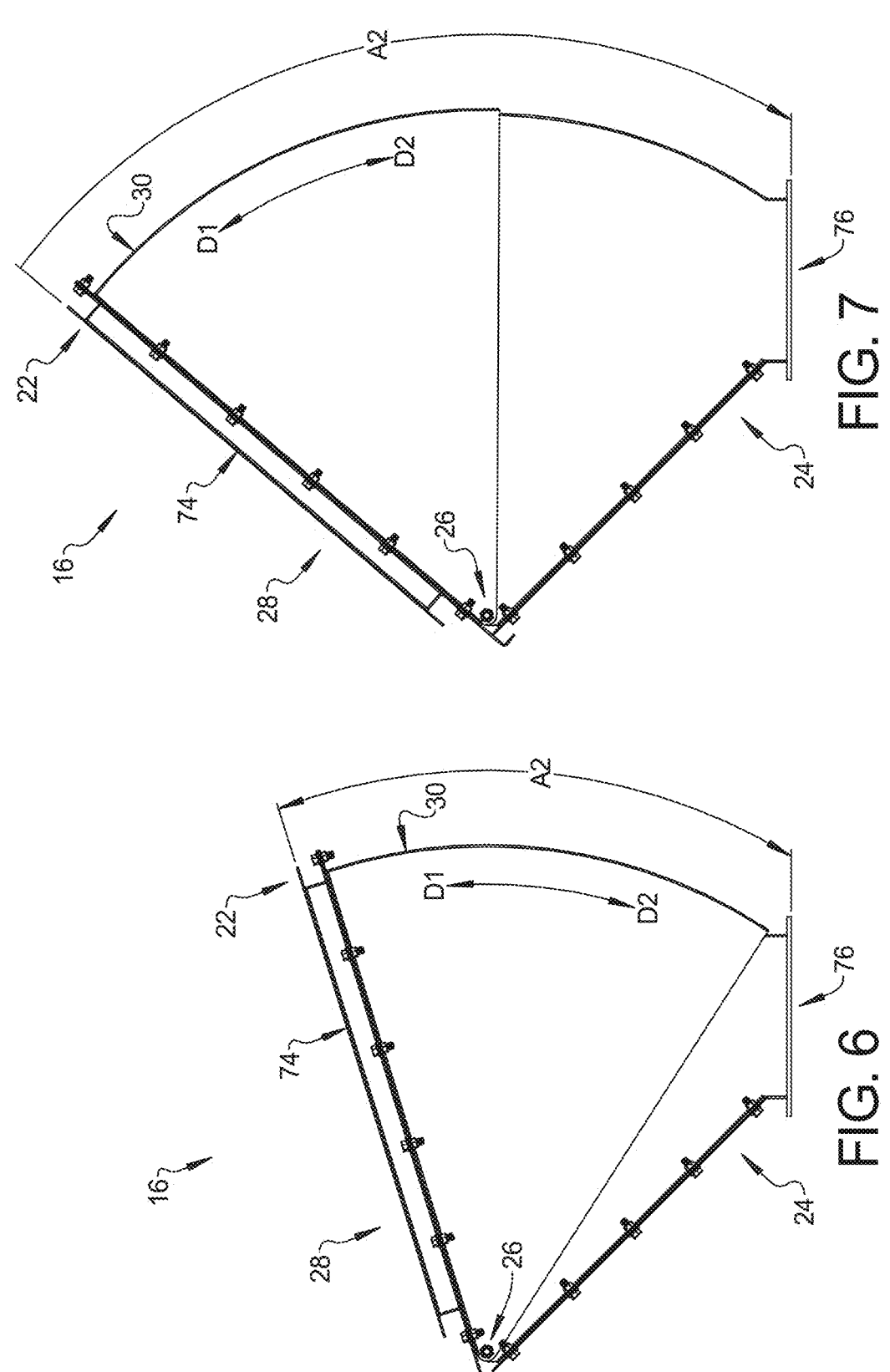
FIG. 6 is a side view of the adjustable transition of FIG. 1 in a first position that yields a minimum angle between inlet and outlet ends of the transition.
FIG. 7 is a side view of the adjustable transition of FIG. 1 in a second position that yields a maximum angle between the inlet and outlet ends of the transition.
Figure 8:
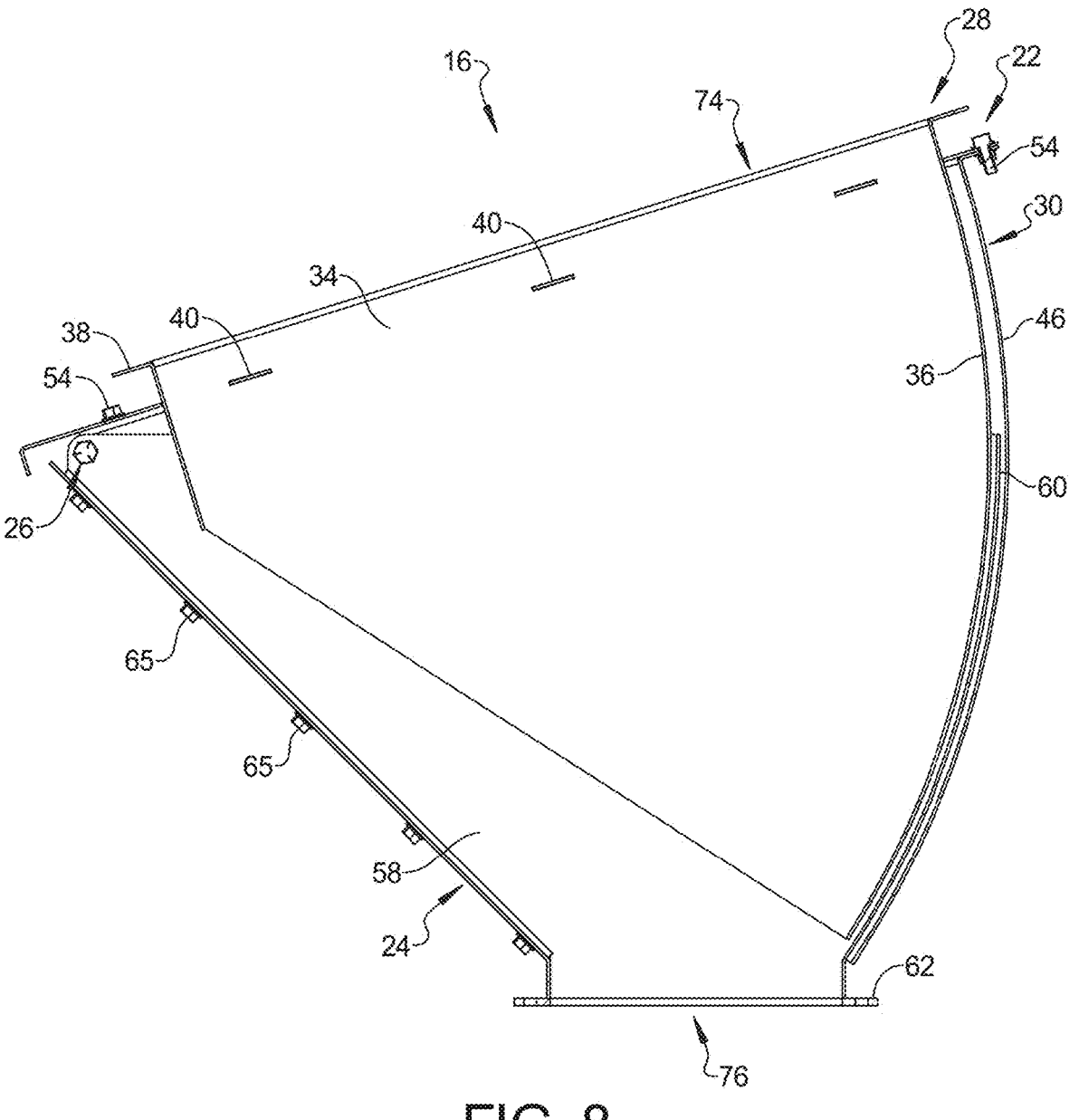
FIG. 8 is a bottom perspective view of the adjustable transition of FIG. 1 with a lower half of the transition pivoted away from an upper half of the transition.

Referring now to FIGS. 6 through 8, the transition 16 has a first open end 74 that receives grain from the conveyor 14 and a second open end 76 that discharges grain to the grain dryer 12 or the grain storage bin. The upper and lower halves 22 and 24 of the transition 16 are pivotable relative to one another about the pivot joint 26 to adjust an angle A2 between the first and second open ends 74 and 76 of the transition 16. The upper and lower halves 22 and 24 of the transition 16 are pivotable relative to one another about the pivot joint 26 in a first direction D1 and a second direction D2 that is opposite of the first direction D1.

In FIG. 6, the angle A2 between the upper and lower halves 22 and 24 of the transition 16 is adjusted to its minimum value (e.g., 18 degrees) when installed on the grain dryer 12 or the gain storage bin. In FIG. 7, the angle A2 between the upper and lower halves 22 and 24 of the transition 16 is adjusted to its maximum value (e.g., 50 degrees) when installed on the grain dryer 12 or the gain storage bin. The first and second open ends 74 and 76 of the transition 16 are disposed opposite of one another along the first and second directions D1 and D2.

In FIG. 8, one of the side walls 34 of the inner housing 28, one of the side walls 44 of the outer housing 30, and one of the side walls 58 of the lower half 24 are omitted to illustrate how the lower half 24 is inserted into the upper half 22 when the transition 16 is installed. The lower half 24 is inserted between the inner and outer housings 28 and 30 of the upper half 22 as the lower half 24 is pivoted toward the upper half 22. For example, the front wall 60 of the lower half 24 is inserted between the front walls 36, 46 of the inner and outer housings 28 and 30 as shown in FIG. 8. Similarly, the side walls 58 of the lower half 24 are inserted between the side walls 34 of the inner housing 28 and the side walls 44 of the outer housing 30. Insertion of the lower half 24 within the double-wall structure of the upper half 22 prevents grain flowing through the transition 16 from spilling out through gaps between the upper and lower halves 22 and 24.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As used herein, the term "and/or" includes any and all combinations of one or more of the associated listed items. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A transition for connecting a discharge end of a conveyor to an inlet end of a grain storage bin or grain dryer, the transition comprising:
 an upper half configured to be attached to the discharge end of the conveyor;
 a lower half configured to be attached to the inlet end of the grain storage bin or grain dryer; and
 a pivot joint connecting the upper and lower halves to one another while allowing the upper and lower halves to pivot relative to one another to accommodate an angle at which the conveyor is inclined.

2. The transition of claim 1 wherein:
 the upper half includes an inner housing and an outer housing; and
 the lower half is inserted between the inner and outer housings of the upper half as the lower half is pivoted toward the upper half.

3. The transition of claim 2 wherein each of the inner housing, the outer housing, and the lower half includes side walls and a front wall.

4. The transition of claim 3 wherein as the lower half is pivoted toward the upper half, the front wall of the lower half is inserted between the front walls of the inner and outer housings of the upper half, and the side walls of the lower half are inserted between the side walls of the inner and outer housings of the upper half.

5. The transition of claim 1 wherein:
 the transition has a first open end configured to receive grain from the conveyor and a second open end configured to discharge grain to the grain storage bin or grain dryer; and
 the first and second open ends of the transition are disposed opposite from one another along a direction in which the upper and lower halves are pivotable relative to one another.

6. The transition of claim 5 wherein the pivot joint allows the upper and lower halves to pivot relative to one another to adjust an angle between the first and second open ends of the transition, and the angle is adjustable from a minimum value to a maximum value when the transition connects the conveyor to the grain storage bin or grain dryer.

7. The transition of claim 6 wherein a range between the minimum and maximum values is greater than 30 degrees.

8. The transition of claim 1 wherein the pivot joint includes at least one stud extending through a pair of holes in the upper half and through a pair of holes in the lower half.

9. The transition of claim 8 wherein the at least one stud includes a pair of bolts, one of the bolts is inserted through one of the holes in the upper half and one of the holes in the lower half, the other one of the bolts is inserted through the other one of the holes in the upper half and the other one of the holes in the lower half, and the pivot joint further includes a pair of nuts that are threaded onto shanks of the bolts.

10. The transition of claim 1 wherein the transition is free of any baffle or wear plate for cushioning grain that flows downward therethrough due to the force of gravity.

11. A grain handling assembly comprising:
 a conveyor configured to be inclined at an angle relative to a horizontal plane and to carry grain upward along its inclination angle, the conveyor having a discharge end; and
 a transition configured to attach the discharge end of the conveyor to an inlet end of a grain storage bin or gran dryer, wherein the transition is adjustable to accommodate variations in the inclination angle of the conveyor.

12. The grain handling assembly of claim 11 wherein the transition includes:
 an upper half configured to be attached to the discharge end of the conveyor;
 a lower half configured to be attached to the inlet end of the grain storage bin or grain dryer; and
 a pivot joint connecting the upper and lower halves to one another while allowing the upper and lower halves to pivot relative to one another to accommodate the angle at which the conveyor is inclined.

13. The grain handling assembly of claim 12 wherein:
 the upper half includes an inner housing and an outer housing; and
 the lower half is inserted between the inner and outer housings of the upper half as the lower half is pivoted toward the upper half.

14. The grain handling assembly of claim 13 wherein each of the inner housing, the outer housing, and the lower half includes side walls and a front wall.

15. The grain handling assembly of claim 14 wherein as the lower half is pivoted toward the upper half, the front wall of the lower half is inserted between the front walls of the inner and outer housings of the upper half, and the side walls of the lower half are inserted between the side walls of the inner and outer housings of the upper half.

16. The grain handling assembly of claim 12 wherein:
 the transition has a first open end configured to receive grain from the conveyor and a second open end configured to discharge grain to the grain storage bin or grain dryer; and
 the first and second open ends of the transition are disposed opposite from one another along a direction in which the upper and lower halves are pivotable relative to one another.

17. The grain handling assembly of claim 16 further comprising the grain storage bin or grain dryer, wherein the pivot joint allows the upper and lower halves to pivot relative to one another to adjust an angle between the first and second open ends of the transition, and the angle is adjustable from a minimum value to a maximum value when the transition connects the conveyor to the grain storage bin or grain dryer.

18. The grain handling assembly of claim 17 wherein a range between the minimum and maximum values is greater than 30 degrees.

19. The grain handling assembly of claim 12 wherein the pivot joint includes at least one stud extending through a pair of holes in the upper half and through a pair of holes in the lower half.

20. The grain handling assembly of claim 19 wherein the at least one stud includes a pair of bolts, one of the bolts is inserted through one of the holes in the upper half and one of the holes in the lower half, the other one of the bolts is inserted through the other one of the holes in the upper half and the other one of the holes in the lower half, and the pivot joint further includes a pair of nuts that are threaded onto shanks of the bolts.

\* \* \* \* \*